Patented Dec. 23, 1941

2,267,490

UNITED STATES PATENT OFFICE 2,267,490

SOLUBILIZING CLAYLIKE MINERALS

Karl Büche, Essen-Rellinghausen, and Hans Ginsberg, Lautawerk, Lausitz, Germany, assignors, by mesne assignments, to Th. Goldschmidt Corporation, New York, N. Y., a corporation of Delaware No Drawing. Application October 31, 1938, Serial No. 238,100. In Germany November 3, 1937

1 Claim. (Cl. 23—143)

This invention relates to solubilizing clay-like minerals; and it comprises a process of treating aluminiferous minerals containing silicic acid to make them acid-soluble and suitable for use in the sulfite digestion process wherein such a mineral is first treated to produce a substantially uniform granulation, then calcined at temperatures ranging from about 600° to 800° C. by a method involving the subjection of the granules to direct heating, the calcined granules then being crushed; the degree of crushing being only sufficient to rupture the acid-insoluble incrustations produced on the granules by the calcining operation. The invention also includes the use of the described granulating and crushing steps either alone or in combination in the solubilizing process, as well as the product produced by the said process; all as more fully hereinafter set forth and as claimed.

In many processes, for example in the sulfite extraction process of treating clay, it is desired to convert raw clay-like minerals into a state in which they are readily soluble in an acid, such as sulfurous acid, for example. It has been found necessary to subject these raw materials to a calcining process in order to produce a satisfactory rate and degree of solution. This calcining process has invariably been conducted by heating the raw materials directly, that is, by means of an open flame, using gas, oil or pulverized coal fired furnaces, usually of the rotary type. Indirect heating of such raw materials is uneconomical owing to the inevitable heat losses, the higher cost of equipment, etc. But it has been found that the calcined clays obtained by these conventional methods are substantially less soluble than those obtained by the indirect heating methods which are usually used in the laboratory as plant control tests, for example. The greatest difficulties are encountered when it is attempted to increase the solubility of the calcined clays by changes in operating conditions in the direct heating method.

We have discovered the cause for these difficulties and the present invention provides a simple method of overcoming them.

In the usual direct-fired rotary furnaces the materials being calcined are exposed to maximum furnace temperatures for a short time only. We have found that, if a clay of non-uniform granulation is calcined in such a furnace, its solubility is substantially below that which would be expected from laboratory tests. The optimum temperature of calcination to produce maximum acid solubility covers the relatively narrow and critical range of from 600° to 800° C. Any material which is heated above this range is overburned and any which does not reach temperatures within this range is under-calcined. Both types of material have an inferior solubility. If the clay is fed to the usual rotary furnace in moist condition and in the state of non-uniform granulation, it appears impossible to obtain a uniform calcination and a product having a maximum solubility. If the furnace atmosphere is maintained within the optimum calcining range, the small particles become properly calcined but the larger particles are not sufficiently heated. If it is attempted to remedy this condition by increasing the temperature of the furnace atmosphere, it is found that the fines are over-burned. In either case a non-uniform product of inferior acid solubility is produced.

When a calcined clay produced by usual calcining methods is subjected to the usual test for acid solubility, that is, to the action of a 6 per cent hydrochloric acid solution at a temperature of 80° C. for a period of 2 hours, it will be found that a considerable residue of undissolved clay remains. In conducting an examination of this residue we found that its external appearance is almost identical to that of freshly calcined clay and, upon chemical analysis, we discovered that its analysis also is substantially identical to that of the calcinate. These facts led to the further discovery that a substantial proportion of the particles of any clay which has been calcined by direct heating is covered with an acid-insoluble film coating of over-burned material which substantially prevents the penetration of the acid to the interior of the calcined particles. This coating is probably highly siliceous. We have found that such particles can be solubilized by fine grinding but we also made the surprising discovery that only a slight crushing of these particles is required to render them as soluble as when finely ground. Apparently when this thin acid-insoluble coating is disrupted even to a small extent, the particles become soluble as a whole.

We also discovered that a substantial improvement of the acid solubility of calcined clay is obtained provided that the clay is treated in such manner as to produce a substantially uniform granulation prior to calcination. Apparently the cause for this phenomenon is that, if the particle size of the material being calcined is uniform, there is a uniform penetration of the heat into the particles and it is therefore possible to calcine the batch as a whole much more uniformly and to the optimum temperatures required to produce maximum solubility. The over-burned and the under-calcined particles in the final product are substantially eliminated by this preliminary granulating step. The gain in solubility and efficiency of extraction more than counter-balance the increase in over-all cost of treatment caused by the use of this pre-granulating step. If our step of coarsely grinding the calcinate is used in combination with the pre-granulating step, there is a substantial gain in efficiency in the process as well as a saving in cost of operation.

The granulation of the raw clay can be accomplished by conventional methods. One method which we have found to be satisfactory and inexpensive involves the use of the common edge runner mill. In this mill two or more cylinders of stone or metal are mounted on horizontal axes. These axes are attached to a central vertical pedestal which revolves and causes the cylinders to roll along on top of the base plate as well as to produce a side-wise drag which causes a grinding and crushing action due to the weight of the cylinders pressing against the grinding surface of the base plate. We have found that, when such a mill is provided with a base plate having properly spaced and positioned perforations and a slightly moist clay, a pit-moist clay, for example, is introduced, the clay becomes thoroughly kneaded and plasticized and is forced or extruded through the perforations in vermicular or rod-like form. And when revolving cutting knives are provided beneath the base plate, the extruded clay can be cut into short rods of uniform length and diameter. Dust is substantially eliminated in this manner. It is obvious, of course, that many other conventional methods of producing a uniform granulation of the raw clay can be used in our process. Various extrusion presses and the so-called clay planers are available for this purpose. It is only necessary that the raw clay be reduced to a mass of substantially uniform granules in this preliminary step of our process.

The size of the granules used in our process can be correlated to some extent with the temperature to which the calcining furnace is heated and the time during which the granules are exposed to maximum furnace temperatures. The larger the granules, the higher the temperatures which must be employed or the longer the granules must be exposed to furnace temperatures. The optimum furnace conditions which are required to produce maximum solubility of the calcined granules under any given set of conditions can be readily determined by a series of suitable tests. Under ordinary operating conditions, however, we have found that best results are produced provided that the granules of raw clay have what may be termed a medium granulation, that is a grain size ranging from about 5 to 30 mm. The smallest dimension of the granules is, of course, the most important factor in the granulation, that is, the temperature and the time required to produce satisfactory calcination of the granules is largely determined by their smallest dimension.

In the crushing operation which follows the calcining step in my process any of the conventional crushing devices may be employed. Coarse crushing of the granules only is required. This can be accomplished by passing the calcined granules between crushing rolls set some distance apart, this distance, for example, being only slightly less than the grain size of the granules, in order to ensure that all granules are broken or crushed. As indicated previously it is only necessary that the insoluble coating on the calcined granules be ruptured to a slight extent in order to render them substantially completely soluble. Since fine grinding is not required in our process a substantial saving in cost of operation is effected. When the calcined granules have a medium granulation, having a particle size ranging from about 5 to 30 mm., for example, we have found that the optimum particle size to which these calcined granules must be crushed to obtain maximum acid solubility, ranges from about 2 to 15 mm., this granulation advantageously being substantially uniform.

Our invention is useful in the solubilizing of all types of clays and kaolins and to aluminiferous minerals containing silicic acid in general. The analysis of a typical clay (a pit-moist Niederlausitz clay) which we have used in our process is as follows:

|  | Per cent |
|---|---|
| Volatiles (including water) | 35.6 |
| $Al_2O_3$ | 24.8 |
| $Fe_2O_3$ | 1.8 |
| $TiO_2$ | 1.5 |
| $SiO_2$ | 36.0 |

When calcined within the range of 600° to 800° C. this clay has an acid solubility ranging from about 70 to 80 per cent of the $Al_2O_3$ present.

Our invention may be described somewhat more specifically by reference to the following specific examples which represent practical embodiments of our process as conducted in actual practice.

*Example 1*

A Niederlausitz raw clay was disintegrated by means of a clay cutter, yielding a product of non-uniform granulation. This was directly heated in a rotary furnace of conventional type to a maximum temperature of about 800° C., producing a calcined product also of non-uniform granulation. The bulk of this calcined material had a grain size ranging between 5 to 30 mm. the remainder ranging in size down to a fine dust. A preliminary laboratory test, in which a calcination had been conducted at the same temperature in an externally heated muffle furnace had indicated that this product should have a solubility of about 80 per cent of the alumina by weight. The solubility actually obtained, however, was only 73 per cent, upon contacting the ground product with a 6 per cent hydrochloric acid solution at 80° C. for a period of 2 hours. This calcination product was then screened to divide it into three portions of different particle size. The first portion, having a particle size above 30 mm. was found to have a solubility, when finely ground, of 70 per cent. The second portion, having a particle size ranging between 5 and 30 mm., was found to have a corresponding solubility of 79 per cent. And the third portion, having a particle size below 5 mm., was found to have a solubility of only 60 per cent.

In a comparative test the same raw clay was initially treated in an edge runner mill provided with a perforated grinding plate having perforations with an internal diameter of 20 mm. The rotating knives beneath the grinding plate of the mill were adjusted to the point at which the clay which was extruded through the perforations was cut into rods having a length of about 20 mm. This uniformly granulated clay product was calcined under the same conditions as those used previously. The calcined product was found to have a solubility of 79 per cent when ground. A small proportion of fines was present in the calcined product produced by friction in the process, but this did not affect the solubility substantially. This shows the improved results obtained when the preliminary granulating step of our process is employed.

*Example 2*

A sample of clay containing 38.5 per cent of $Al_2O_3$ and about 52 per cent of $SiO_2$ was calcined in the form of non-uniform pieces, producing a calcined product of non-uniform granulation. The $Al_2O_3$ solubility of this product when ground was found to be 70 per cent. It was found, however, that when this product was placed in a reaction tower without grinding and then subjected to the action of an aqueous sulfurous acid solution under conditions of elevated temperature and super-atmospheric pressure, as in the sulfite extraction process, only 50 per cent of the $Al_2O_3$ could be extracted. The residue from this extraction still contained 14.1 per cent of $Al_2O_3$. This shows the importance of disrupting the acid-insoluble film which is present on the particles of calcined clay which have been subjected to direct heating during calcination.

*Example 3*

The non-uniformly granulated and calcined product obtained in Example 2 was passed through a crushing mill between rolls moving in opposite directions and spaced 15 mm. apart. The product coarsely crushed in this manner was subjected to the action of sulfurous acid in the same reaction tower used in Example 2 and under the same operating conditions. In this case, however, it was found possible to extract 69 per cent of the $Al_2O_3$ present, as compared with 50 per cent obtained before crushing. The extracted product was found to contain only 9.9 per cent of undissolved $Al_2O_3$. These results indicate clearly that coarse crushing of the calcined product produces substantially the same increase in the solubility of the $Al_2O_3$ as is produced by fine grinding. This becomes of considerable importance in the sulfite extraction process, for example.

In the sulfite extraction process calcined clay is charged into reaction towers having capacities of the order of 30 cubic meters. Sulfurous acid is then passed through the beds of calcined clay under elevated temperatures and pressures. It is almost impossible to conduct this process in the manner described with finely ground clay. The slimes formed soon stop the flow of sulfurous acid through the towers. But our present invention enables efficient extraction to be obtained in this process with calcined clay having a substantial particle size and yet having a high alumina solubility, the particle size of the calcined clay having been reduced only slightly during the described crushing operation.

*Example 4*

The same crude clay as used in the preceding examples was granulated into a product having a uniform particle size of about 20 mm. by means of the edge runner mill which has been described previously, provided with a perforated grinding plate having perforations of 20 mm. diameter. This pre-granulated product was calcined in the same rotary furnace, the maximum furnace temperature employed being 780° C. It was found that only 40 per cent of the $Al_2O_3$ content of the resulting uncrushed, granulated product could be extracted even by contacting it with boiling 6 per cent hydrochloric acid for a period of 3 hours. It was found, however, that when this product was subjected to a coarse crushing operation in accordance with the present invention, which reduced it to an average grain size of about 5 mm., no less than 89 per cent of its $Al_2O_3$ content became soluble when treated with acid under the same conditions. This example illustrates the advantages gained by the use of the preliminary granulating step in combination with the subsequent coarse crushing step of the present invention.

While we have described what we consider to be the best embodiments of the present invention, it is obvious that many variations can be made in the specific procedures described without departing from the purview thereof. Our invention obviously includes the acid-soluble granulated product produced by our preferred process since this appears to be the first calcined clay product having a substantial particle size and yet having substantially the maximum possible acid solubility. This product can be described as a granulated, calcined clay product consisting mostly of granules usually having a particle size ranging from about 2 to 15 mm., the bulk of the particles of said product being partially coated with an acid-insoluble, overburned film but also having reactive, acid-soluble faces free from said film, the acid solubility of said particles being substantially equal to that of a finely ground calcined product produced from the same clay, under conditions producing maximum acid solubility. The initial granulating step of our process, the calcining step and the crushing step can all be conducted in conventional apparatus of various types and sizes. In the granulating step it is only necessary to treat the raw clay in such manner that the major proportion is formed into particles or pieces of substantially uniform size being capable of being calcined uniformly. In the crushing step it is only necessary to rupture the acid insoluble film on the calcined granules at one or more points and it is usually preferred to conduct this operation with the least possible reduction in actual particle size. This is particularly true if it is desired to obtain our acid soluble product in a granular form which will not pack under the action of aqueous liquids. This latter step of the process can, of course, be conducted wet or dry. And it is possible to conduct this coarse crushing step in the presence of an acid, if desired, so that the acid will act immediately upon the freshly exposed surfaces of the particles. Other modifications of our invention which fall within the scope of the following claim will be immediately evident to those skilled in this art.

What we claim is:

In the extraction of alumina from clay with acid, the process which comprises forming a mass of siliceous raw clay into coarse granules of substantially uniform size not substantially less than 5 mm. in diameter, calcining said granules at a temperature ranging from about 600° to 800° C. under conditions of direct heating, whereby the cores of said granules are rendered acid soluble but acid insoluble incrustations are formed on said granules, then rupturing said incrustations by passing said granules between rolls set at a distance apart which is only slightly less than the size of the granules and without substantial reduction in the size of said granules, forming a bed of said coarsely crushed granules and passing an acid leach liquor through said bed, whereby high extraction rates and efficiencies are obtained without any packing of said bed.

KARL BÜCHE.
HANS GINSBERG.